(12) United States Patent
Witchey

(10) Patent No.: US 8,924,518 B2
(45) Date of Patent: Dec. 30, 2014

(54) COMMUNICATION PROTOCOL CONVERTER AND METHOD OF PROTOCOL CONVERSION

(75) Inventor: Nicholas James Witchey, Laguna Hills, CA (US)

(73) Assignee: Lantronix, Inc., Irvine, CA (US)

( * ) Notice: Subject to any disclaimer, the term of this patent is extended or adjusted under 35 U.S.C. 154(b) by 712 days.

(21) Appl. No.: 12/435,700

(22) Filed: May 5, 2009

(65) Prior Publication Data

US 2009/0216895 A1 Aug. 27, 2009

Related U.S. Application Data

(62) Division of application No. 10/712,084, filed on Nov. 13, 2003.

(51) Int. Cl.
*G06F 15/16* (2006.01)
*H04L 29/06* (2006.01)
*H04L 29/08* (2006.01)

(52) U.S. Cl.
CPC ............ *H04L 69/167* (2013.01); *H04L 29/06* (2013.01); *H04L 29/08072* (2013.01); *H04L 69/08* (2013.01)
USPC ............ 709/220; 709/226; 709/227; 370/398

(58) Field of Classification Search
USPC ............................ 709/203, 223, 228; 713/201
See application file for complete search history.

(56) References Cited

U.S. PATENT DOCUMENTS

| | | | |
|---|---|---|---|
| 4,789,847 A | 12/1988 | Sakamoto et al. | |
| 4,978,317 A | 12/1990 | Pocrass | |
| 5,015,204 A | 5/1991 | Sakamoto et al. | |
| 5,069,641 A | 12/1991 | Sakamoto et al. | |
| 5,095,480 A * | 3/1992 | Fenner | 370/238 |
| 5,139,442 A | 8/1992 | Sakamoto et al. | |
| 5,282,759 A | 2/1994 | Sakamoto et al. | |
| 5,587,884 A | 12/1996 | Raman | |
| 5,647,765 A | 7/1997 | Haas et al. | |
| 5,647,767 A | 7/1997 | Scheer et al. | |
| 5,671,355 A | 9/1997 | Collins | |
| 5,764,155 A | 6/1998 | Kertesz et al. | |

(Continued)

OTHER PUBLICATIONS

Tyco Electronics, "Gigabit Ethernet Multimode SFP MT-RJ Transceivers," Catalogue 1308513, 2000, pp. 1-11.

(Continued)

*Primary Examiner* — Khanh Dinh
(74) *Attorney, Agent, or Firm* — Rutan & Tucker LLP; Hani Z. Sayed

(57) ABSTRACT

The present invention generally relates to a communication protocol converter to allow a legacy device utilizing IPv4 to operate across the network using IPv6. In a first embodiment of the invention, two modular Ethernet connectors are placed side-by-side. A first modular connector receives IPv4 Ethernet data which is converted to a raw data signal. The data is transmitted from the first modular connector to a second modular connector by a bidirectional data line. The second connector receives the raw data, and a raw data-to-Ethernet conversion is completed providing output at IPv6. The present invention utilizes the form factor structure of the Ethernet connectors, so that the entire electronic circuitry is contained within the connectors to complete the conversion. An alternate embodiment incorporates the connectors into a single housing and the conversion is completed internally by a microprocessor and embedded software. A method of IPv4 to IPv6 conversion is additionally disclosed.

2 Claims, 7 Drawing Sheets

(56) References Cited

U.S. PATENT DOCUMENTS

| | | | |
|---|---|---|---|
| 5,768,148 A | 6/1998 | Murphy et al. | |
| 5,828,905 A | 10/1998 | Rao | |
| 5,842,045 A | 11/1998 | Nakamura | |
| 5,862,391 A | 1/1999 | Salas et al. | |
| 6,038,233 A | 3/2000 | Hamamoto et al. | |
| 6,118,784 A | 9/2000 | Tsuchiya et al. | |
| 6,128,673 A | 10/2000 | Aronson et al. | |
| 6,131,125 A | 10/2000 | Rostoker et al. | |
| 6,203,334 B1 | 3/2001 | Daoud et al. | |
| 6,350,152 B1 | 2/2002 | Belopolsky et al. | |
| 6,370,603 B1 | 4/2002 | Silverman et al. | |
| 6,381,283 B1 | 4/2002 | Bhardwaj et al. | |
| 6,478,611 B1 | 11/2002 | Hyland | |
| 6,961,311 B2 | 11/2005 | Rakotoarivelo et al. | |
| 7,076,555 B1 * | 7/2006 | Orman et al. | 709/227 |
| 7,116,681 B1 | 10/2006 | Hovell et al. | |
| 7,153,163 B2 * | 12/2006 | Lewis et al. | 439/620.11 |
| 7,213,061 B1 * | 5/2007 | Hite et al | 709/223 |
| 7,443,862 B2 * | 10/2008 | Nishio | 370/395.54 |
| 8,510,420 B1 * | 8/2013 | Brandwine et al. | 709/220 |
| 8,560,646 B1 * | 10/2013 | Sivasubramanian et al. | 709/220 |
| 8,683,023 B1 * | 3/2014 | Brandwine et al. | 709/222 |
| 2002/0188871 A1 * | 12/2002 | Noehring et al. | 713/201 |
| 2003/0194908 A1 * | 10/2003 | Brown et al. | 439/620 |
| 2004/0012933 A1 * | 1/2004 | Lewis et al. | 361/760 |
| 2010/0103837 A1 * | 4/2010 | Jungck et al. | 370/252 |

OTHER PUBLICATIONS

Network Working Group, www.ietg.org/rfc/rfc2766. txt printed on Jul. 26, 2002, 20 pages.

* cited by examiner

COMMUNICATION PROTOCOL CONVERTER AND METHOD OF PROTOCOL CONVERSION

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates generally to communication protocol conversion. More particularly, the invention relates to an apparatus and method of completing a conversion from Internet protocol version 4 to Internet protocol version 6 utilizing modular data converters capable of converting formatted data on a first Ethernet data stream to data in a different format on a second Ethernet data stream.

Most of the Internet utilizes Internet protocol version 4 (IPv4) which has been employed for nearly twenty years. Each new device added to the Internet is assigned a unique address. Due to the exploding use of the Internet there is a growing shortage of IPv4 addresses. As is apparent, global Internet routing based upon the 32-bit addresses of IPv4 is becoming increasingly strained. In addition to the foregoing, IPv4 addresses lack the flexibility to construct efficient hierarchies. Classless Internet-domain routing has extended the lifetime of IPv4 routing, however, the difficulty associated with managing the routing continues to increase and it is foreseeable that the Internet will eventually exhaust its supply of useable network numbers.

In an attempt to address the inherent problems with IPv4, Internet protocol version 6 (IPv6) has been designed as an evolutionary step from IPv4. Importantly, IPv4 and IPv6 are not completely interoperable. IPv6 addresses the perceived deficiencies in IPv4, such as the limited number of available IP addresses, and additionally adds many improvements in areas such as routing and network auto configuration. IPv6 is designed to run well on high performance networks while simultaneously efficiently running on low bandwidth networks (i.e., wireless) IPv6 is expected to gradually replace IPv4 with the two Internet protocols coexisting for a number of years during a transition. Initially devices supporting IPv6 will be rare amongst IPv4 devices. IPv6 devices will be required to be able to communicate with IPv4 hosts. As the transition progresses, IPv6 devices will dominate over IPv4 thereby isolating the legacy IPv4 devices. IPv6 hosts will communicate with IPv4 hosts through many known methods such as IPv4/IPv6 stacks, tunneling IPv6 over IPv4, Network Address Translation-Protocol Translation (NAT-PT) and Stateless IP/ICMP Translation. However, once IPv6 dominates the Internet there will be a large number of legacy devices and hosts currently on the Internet utilizing IPv4. Because IPv4 supports only a limited number of devices, and the Internet is rapidly reaching its limit, such IPv4 legacy devices will eventually need to be replaced or modified at great expense to support IPv6.

Known attempts to address the conversion issue include routers developed by such companies such as Cisco that will allow IPv4 to IPv6 conversion, but such technology is employed on a network-wide basis. Other systems have been described in issued patents such as U.S. Pat. Nos. 6,038,233 and 6,118,784, the substance of which is incorporated herein by reference. Although prior systems address IPv4 to IPv6 conversions, it would be desirable to have a device that includes IPv4 to IPv6 conversion on a one-to-one basis as opposed to many-to-many. Current practices for conversion additionally include a technique for hosts and routers to dynamically tunnel IPv6 packets over IPv4 routing infrastructure. The tunneling technique, however, requires a substantial configuration which is time consuming and expensive. It would be desirable to have a device that would allow to the conversion from IPv4 to IPv6 with minimal configuration to create a homogenous network infrastructure as IPv4 fades away.

BRIEF SUMMARY OF THE INVENTION

The present invention relates to a communication protocol converter primarily directed to allow the use of a legacy device utilizing IPv4 to operate across a network utilizing IPv6. Although the specific embodiments are directed to IPv4 and IPv6, it is recognized that the invention may be employed in relation to any two differing communication protocols or other data translation. In a first embodiment of the present invention, two modular Ethernet connectors are interconnected. A first modular connector has an input of IPv4, which is converted to a raw data signal capable of transferring data at line rates. The signal is transmitted to a second modular Ethernet converter where it is converted from the raw signal to an Ethernet signal utilizing IPv6. The first embodiment of the present invention takes advantage of the efficient form factor structure of the Ethernet connectors and utilizes the device's capability to convert from an Ethernet-to-raw signal. The footprint on a circuit board is minimized and the combined device may be placed between the legacy device and the network thereby allowing an IPv4 to IPv6 conversion with no configuration of the existing legacy system.

The modular connectors incorporated in the first embodiment include a housing, which defines an open cavity and a segregated interior chamber. A connector port having a plurality of electrical contacts positioned within open cavity allows for the mating with a connector plug. Two circuit boards are positioned horizontally within the interior chamber. The circuit boards collectively incorporate Ethernet-to-raw data conversion circuitry components. The Ethernet conversion circuitry includes magnetic circuitry, controller circuitry and LED circuitry. The electrical components are positioned on both sides on at least one of the circuit boards. A memory is additionally positioned on a circuit board, which is in electrical communication with the conversion circuitry. The memory is interconnected to a bidirectional data line that allows the input/output of raw data. In particular, the raw data line is interconnected with a second modular communication jack. The second modular jack receives the raw data across the bidirectional data line, into an onboard memory. The second modular jack converts the raw data to an IPv6 signal, which is made available at the second jack's connector port for transmission to a mating plug. It is specifically contemplated by the present invention that the configuration of the interconnected communication ports may convert from IPv6 to IPv4 as well as IPv4 to IPv6 by reversing the flow of data from the second connector to the first connector.

An alternate embodiment includes a unitary housing having two Ethernet connector ports for receiving two different Internet protocols. A single interior chamber includes PCB boards positioned therein in electrical communication with both connector ports and a microprocessor employing embedded software that executes the protocol conversion.

In operation, software embedded on the components of the circuit boards convert Ethernet data from IPv4 to IPv6 completing the steps of receiving the IPv4 Ethernet data, removing the IPv4 header data, inserting the IPv6 header data, recalculating any necessary Internet Protocol header field options such as traffic class and flow label and thereafter outputting corresponding IPv6 Ethernet data. Likewise, conversion from IPv6 to IPv4 comprises the steps of receiving IPv6 Ethernet data, removing the IPv6 header data, inserting IPv4 header data, recalculating the IPv4 checksum and other Internet Protocol field options and outputting corresponding IPv4 Ethernet data.

A further alternate embodiment includes a unitary housing having two Ethernet ports for receiving two different Internet protocols. A single interior chamber includes PCB boards positioned wherein intellectual communication with both connector ports. A microprocessor, in combination with a physical interface ship (PHY) manipulates data for conversion from one protocol to a second protocol. The microprocessor employs embedded software which executes protocol conversion. In operation, software embedded on the components of the circuit board convert Ethernet data from IPV4 to IPv6 completing the steps of receiving the IPv4 ethernet data, removing the IPv4 header data, inserting the IPv header data, recalculating any necessary Internet protocol header field options such as traffic class inflow label and thereafter outputting corresponding IPv6 Ethernet data. Likewise, conversion from IPv6 to IPv4 comprises a step of receiving the IPv6 Ethernet data, removing the IPv6 header data, inserting IPv4 header data, recalculating the IPv4 check sum and other Internet protocol field options and outputting corresponding Ethernet data.

It should be noted and understood that with respect to the embodiments of the present invention, the materials suggested may be modified or substituted to achieve the general overall resultant high efficiency. The substitutions of materials or dimensions remain within the spirit and scope of the present invention.

BRIEF DESCRIPTION OF THE DRAWINGS

These as well as other features of the present invention will become more apparent upon reference to the drawings wherein.

DETAILED DESCRIPTION OF THE INVENTION

The detailed description as set forth below in connection with the appended drawings is intended as a description of the presently preferred embodiments of the present invention, and does not represent the only embodiment of the present invention. It is understood that various modifications to the invention may be comprised by different embodiments and are also encompassed within the spirit and scope of the present invention.

Figure 1:
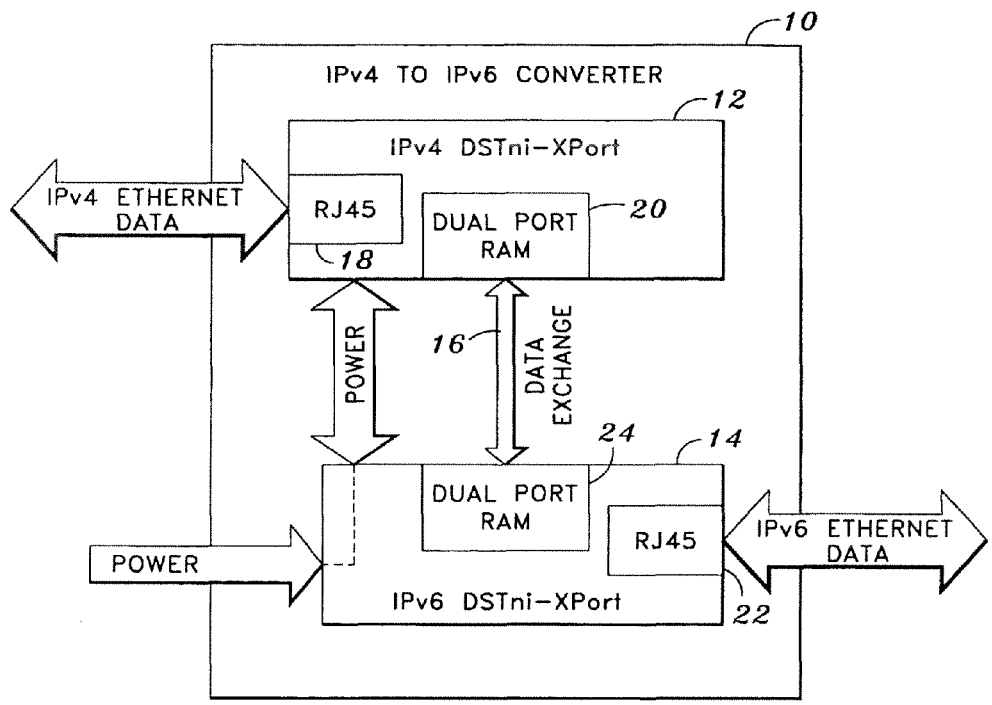
FIG. 1 is a block diagram of the components of a first embodiment of the present invention.

Referring particularly to FIG. 1, there is shown an embodiment of the present invention with the communication protocol converter 10 incorporating two modular Ethernet connectors 12 and 14. Each of the connectors 12 and 14 incorporate a structure described in more detail in FIG. 2. Both modular connectors 12 and 14 are interconnected by a bi-directional data exchange 16.

The first modular connector 12 incorporates an RJ-45 jack 18 for receiving IPv4 Ethernet data. An interior chamber (shown in FIG. 2) of the connector 12 incorporates a PCB board (shown in FIG. 2) incorporating the Ethernet-to-raw data conversion circuitry (not shown) and a dual port random access memory (RAM) 20. Likewise, connector 14 incorporates an RJ-45 jack 22 which is interfaced with a circuit board incorporating the Ethernet-to-raw data conversion circuitry (not shown). A dual port RAM 24 is also incorporated on the circuit board.

In operation, IPv4 Ethernet data is received at RJ-45 jack 18 and is converted to raw data through onboard electronics (not shown). The dual port RAM 20 forwards the raw data through the data exchange 16 to the dual port RAM 24 of the second connector 14. The internal circuitry (not shown) of the connector 14 converts the raw data to IPv6 Ethernet data and makes the signal available at RJ-45 jack 22. The converter 10 works to operate in a reversed direction converting IPv6 to IPv4 Ethernet data.

Figure 2:
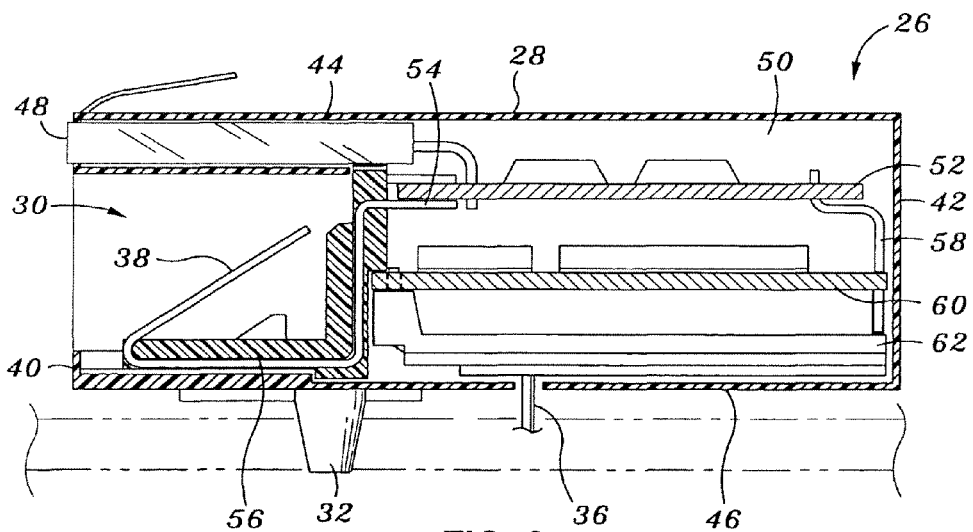
FIG. 2 is a side, partially cut-away view of a modular Ethernet connector used in the first embodiment of the present invention.

Referring particularly to FIG. 2, there is shown a cut side-view of a modular connector such as the modular connectors 12 and 14 as shown in FIG. 10. Connector 26 comprises a generally rectangular housing 28. The front of the housing 28 includes an open cavity 30. A metal Faraday shield covers the top, sides and back of the housing 28 and provides for electromagnetic-radiation (EMR) protection. The connector 26 additionally includes spring biased grounding tabs 32 that connect the Faraday shield to chassis (earth) ground by contacting the enclosure in which the connector is mounted. The Ethernet connector is similar to a serial to Ethernet connector port described in U.S. patent application Ser. No. 10/122,867, entitled "Compact Serial to Ethernet Conversion Port," filed Apr. 15, 2002, the substance of which is incorporated herein by reference. The Ethernet connector to be used is a modified Ethernet connector identified as the DSTni-XPort™, commercially available from Lantronix, Inc, of Irvine, Calif. Also shown, is a lead 36 that interconnects a memory (not shown) to a data exchange 16 (FIG. 1) to interconnect the connector 26 to another connector.

The cavity 30 of the housing 28 incorporates a planar array of parallel electrical contacts 38 to provide the necessary electrical contacts to form a connector port within the cavity 30. The cavity 30 is sized and dimensioned and the contacts 38 are placed within the cavity to compliment a mating plug (not shown). The sized cavity 30, along with the contacts 38, form a standard RJ-45 connector jack. The jack contacts 38 are spring biased for engagement with a mating plug (not shown).

The housing 28 is formed of molded plastic or other suitable material used in the art, covered by a Faraday shield having a front wall 40, a rear wall 42, a top wall 44, a bottom wall 46 and sidewalls (not shown). The references herein of "top", "bottom", and "sides" are made for ease of explanation of the invention and should not be interpreted as limiting in any way. It is contemplated that the connector 26 may be oriented in a multitude of ways on a host product.

The front wall 40 includes LEDs displays 48. The LED displays 48 are interconnected to electronics within the connector 26. The LEDs provide visual status and fault information for various functions of the raw data-to-Ethernet conversion, such as, but not limited to, Ethernet connection speed, link present/absent, full/half duplex, Ethernet activity, data port activity, and microcontroller error conditions.

Housing 28 includes a segregated interior chamber 50. The interior chamber 50 is isolated from the cavity 30 to protect internal electrical components from exposure to exterior elements. A first PCB 52 is disposed within the interior chamber 50 generally horizontal and parallel relative to the bottom wall 46. The first PCB 52 is soldered (or otherwise electrically connected) to the contact interface 54, which are electrical extensions of the contacts 38. Thus, the first PCB 52 is electrically interconnected to the contacts 38 of the port cavity 30. The contact interface 54 additionally provides structural support to the first PCB 52.

The housing 28 includes the open cavity 30 and the interior chamber 50. An insert assembly 56 provides the segregation between the open cavity in the interior chamber 50. The contact 38 is embedded within the insert 56 and extends through the insert 56 and is exposed within the interior chamber 50 as contact interface 54.

A second PCB 60 is also placed within the interior chamber 50, positioned generally horizontal and in general parallel relation to the bottom wall 46. The second PCB 60 is soldered (or otherwise electrically connected) to a base insert 62 which includes an internal lead which interfaces PCB 60 and travels through the base 62 and exits as lead 36. The base insert 62 supports the first end of PCB 60. PCB 60 is supported on the second end by support lead 58. The support leads 58 extends from the base insert 62 through PCB 60 to PCB 52. Lead 58 additionally supports PCB 52. Support Pin 58 thus provides the electrical connection between PCBs 52 and 60.

The first 52, and second PCBs 60 collectively incorporate the electronic circuitry component necessary to complete a raw data-to-Ethernet conversion, PCB 52 includes the magnetics portion of the circuitry which includes, but is not limited, to isolation transformers, common mode chokes, termination resistors, and a high voltage discharge capacitor (for ESD and voltage surges). PCB 60 incorporates all of the electronic circuitry components necessary for the control function of the raw data-to-Ethernet conversion. The electronic components on board PCB 60 include, but are not limited to, a microprocessor and an Ethernet controller (combined in an ASIC for the present invention), nonvolatile memory (flash memory in the present invention), voltage regulator, voltage supervisory circuit, crystals, resistors, capacitors, and ferrite beads (surface mount beads in the present invention).

In operation, the complete connector 26 is mounted on a PCB that is a part of a host device or equipment. Raw data flows from the device and flows through the lead 36 after it is processed by the circuitry collectively incorporated onto PCBs 52 and 60. PCB 52 is interconnected to the contacts 38 which mate with a plug (not shown) to effectively transmit Ethernet data thereto. Ethernet data flows from the Ethernet port through wiper contacts 38 and is processed by the circuitry collectively incorporated onto PCBs 52 and 60, and flow out as raw data through lead pin 36 into the data exchange 16. It is additionally contemplated by the present invention that the control circuitry, magnetic circuitry and LED circuitry may be interchanged among PCBs 52 and 60 and that component may be positioned on one or both sides of each PCB's 52 and 60.

Figure 3:
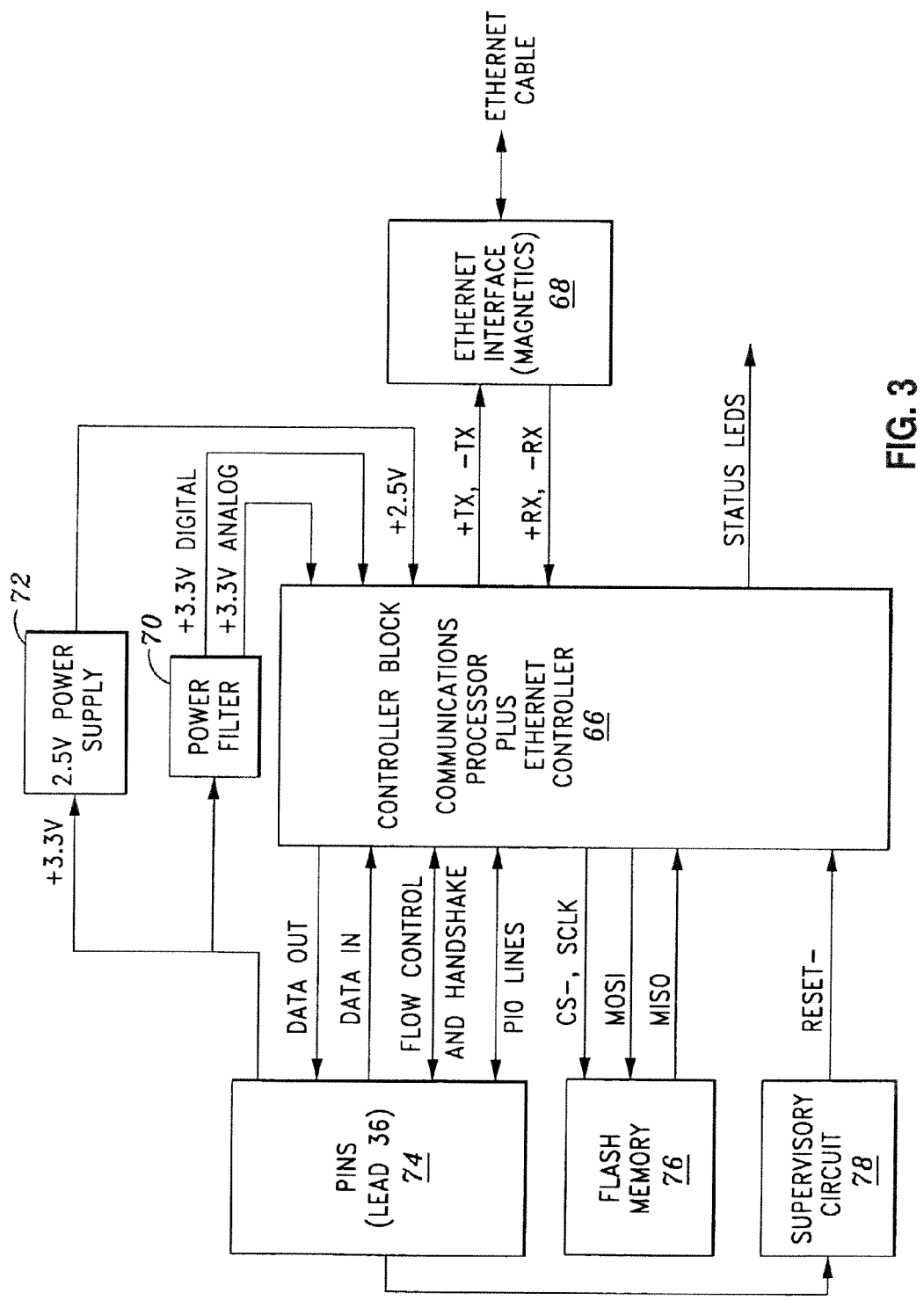
FIG. 3 is a block diagram of the component circuitry for raw data-to-Ethernet converter of the connector shown in FIG. 2.

Referring particularly to FIG. 3 there is shown a block diagram of the controller components of PCB 60. The controller block 66 handles all of the conversion between raw data and Ethernet. This includes processing of the digital (raw data) and analog (Ethernet) signals, as well as all of the required code protocol translations. The controller block 66 communicates with Ethernet through the Ethernet interface 68. The flash memory 76 stores the software that the controller block 66 uses to perform its functions. The supervisory circuit 78 monitors the supply voltage coming in through the PCB IO pins 74. It resets the controller block 66 if the voltage drops too low, or if a signal from the PCB IO pins 74 requests a system reset. The power filters 70 remove noise from the input supply voltage, and also reduce any noise that might be transmitted from the raw data-to-Ethernet converter to the outside world through the voltage supply lines. The 2.5V power supply 72 supplies a second supply voltage that is required by the controller block in the present invention. Raw data is transmitted to and from the controller block through the pin 74 to the external data exchange 16. The flow control and handshake lines (connected through pin 74) are standard signals used to control the raw data stream. The controller block 66 can communicate with the data exchange 16 through the lines connecting through the pin 74. It is understood that although the components as shown in FIG. 3 are specifically identified, it is contemplated by the present invention that any control circuitry that complete the control of function of raw data-to-Ethernet conversion is contemplated by the present invention.

Figure 4:
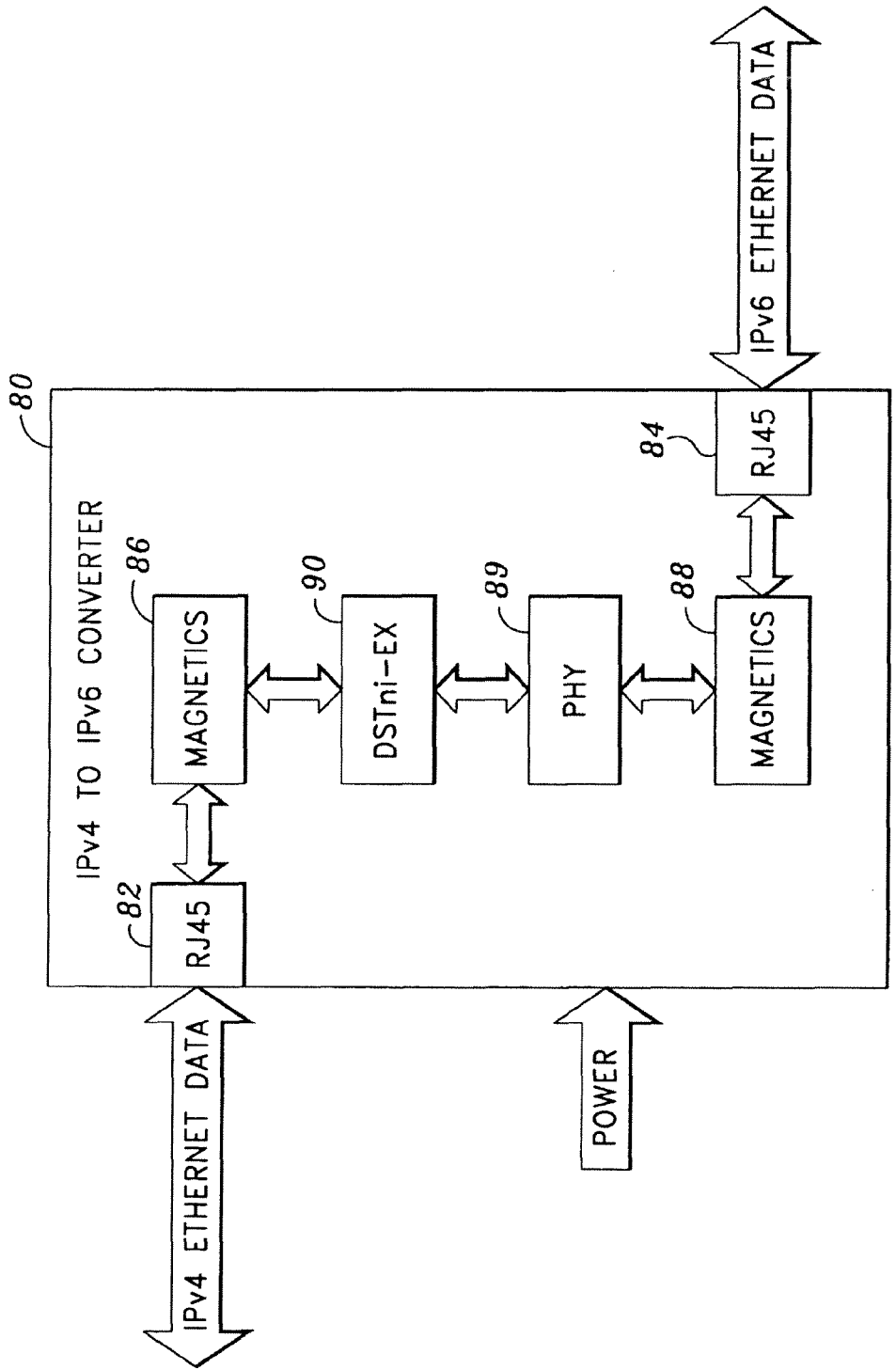
FIG. 4 is a block diagram of the components of an alternative embodiment of the present invention.

Referring particularly to FIG. 4, there is shown an alternative embodiment of the present invention wherein the conversion electronics and the RJ-45 jack are incorporated into a single housing 80. An RJ-45 jack 82 is provided for receiving IPv4 Ethernet data. A second RJ-45 jack 84 is provided for receiving IPv6 Ethernet data. A PCB board (not shown) is located within the housing 80 and includes magnetics 86 for manipulating the Ethernet data signal and providing it to a microprocessor 90. The microprocessor 90 is a DSTni-EX™ chip (EX) manufactured by Lantronix, Inc. of Irvine, Calif., but may be any similar microprocessor design. Examples of other processors that may be used are an ARM, 386, Power PC or any like 32-bit processor. The microprocessor 90, through embedded software manipulates the data signal to provide data to the magnetics 88 through a physical interface (PHY) 89 and provides IPv6 Ethernet at RJ-45 jack 84. Likewise, conversion is completed in the opposite direction, as the system is bidirectional. When connected to the legacy host, the device 80 appears transparent to the host. From the opposite side, the device 80 should appear as the host.

The conversion of the IPv4 data to IPv6 data in this embodiment occurs within the EX processor 90. The conversion software will receive IPv4 data from RJ-45 jack 82. The software will then strip the IPv4 IP headers from the packet and insert new IPv6 headers into the packet. Finally, the revised packet, now an IPv6 packet, will be sent out RJ-45 jack 84. The embodiment will also work in reverse to convert IPv6 packets coming from RJ-45 jack 82 into IPv4 packets sent out RJ-45 jack 82. By using the EX processor 90, the need for two processors and a raw data connection is eliminated as is provided in the embodiments shown in FIG. 1.

Figure 5:
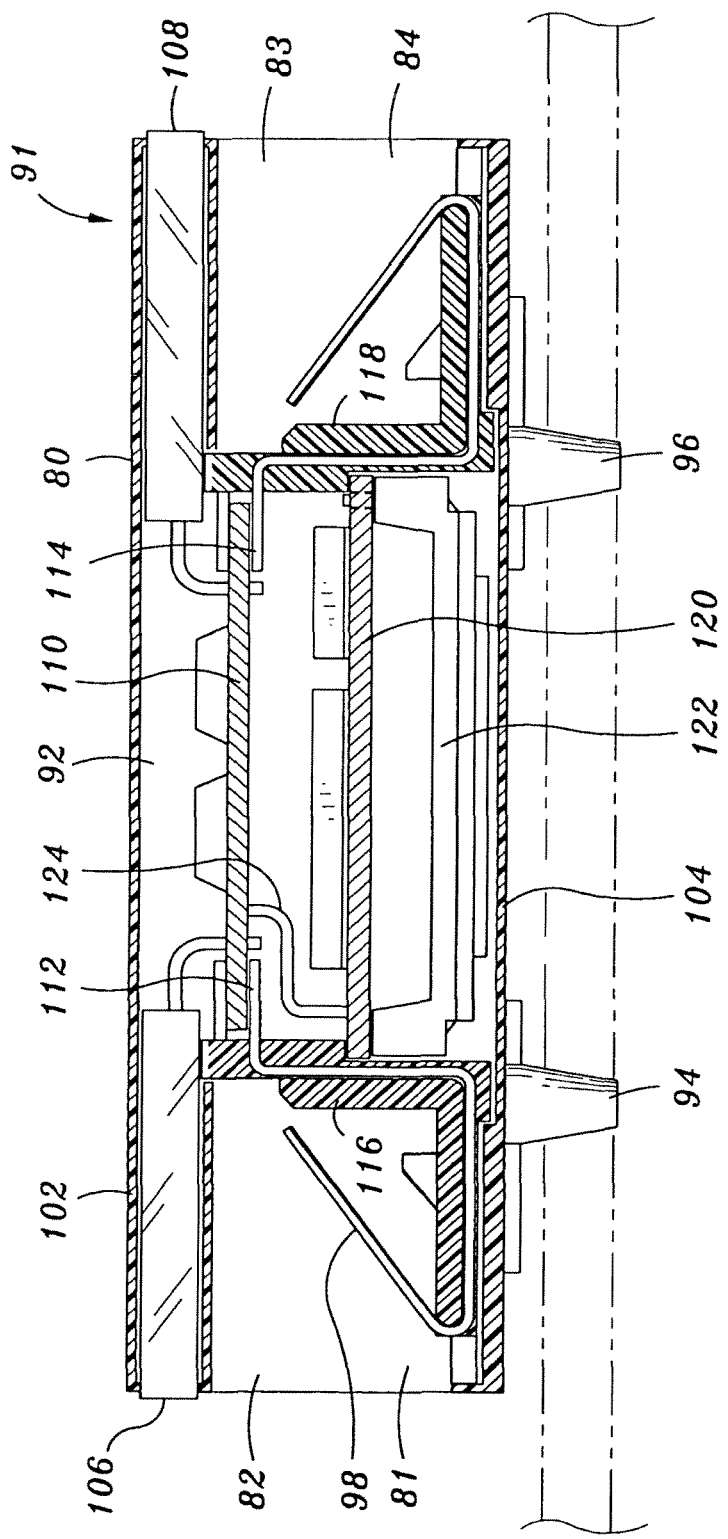
FIG. 5 is a side, partially cut-away view of a dual port Ethernet conversion connector used in the alternative embodiment of the present invention.

Referring particularly to FIG. 5, the physical structure of the alternate embodiment of FIG. 4 is shown. More particularly, there is shown a cut side-view of the modular connector as described with respect to FIG. 4 is shown. The connector 91 comprises a generally rectangular housing 80. The front and rear of the housing 80 includes open cavities 81 and 83. A metal Faraday shield covers the top, sides, and bottom of the housing 80 to provide for electromagnetic-radiation (EMR) protection. Connector 91 additionally includes spring biased grounding tabs 94 and 96 that connect the Faraday shield to chassis (earth) ground by contacting the enclosure in which the connector is mounted. A power port (not shown) provides power necessary to operate the onboard electronics. Power may be drawn from power over the Ethernet, an external wall jack or from parasitic power from a USB or other source.

The cavity 81 of the housing 80 incorporates a planar array of parallel electrical contacts 98 to provide the necessary electrical contacts to form the connector port 82. Likewise the open cavity 83 of the housing 80 incorporates a planar array of parallel electrical contacts 100 to provide the necessary electrical contacts to form the connector port 84. Both cavities 81 and 83 are sized and dimensioned such that contacts 98 and 100 are placed within the cavities 81 and 83 to compliment a mating RJ-45 plug (not shown). The cavities 81 and 83 along with the contacts 98 and 100 form standard RJ-45 connector jacks. The jack contacts 98 and 100 are spring biased for engagement with a mating plug (not shown). The housing 80 is formed of a molded plastic or other suitable material used in the art, covered by a Faraday shield having a top wall 102, a bottom wall 104, and side walls (not shown). The references herein of "top", "bottom", and "sides" are made of ease of explanation of the invention and should not be interpreted as limiting in any way. It is contemplated that the connector 91 may be oriented in a multitude of ways on a host product. Each of the RJ-45 connectors 82 and 83 incorporate LED displays 106 and 108. The LED displays 106 and 108 are interconnected to electronics within the connector 91. The LEDs 106 and 108 provide visual status and fault information for various functions of the protocol conversion such as, but not limited to, Ethernet connections, speed, link present/absent, full/half duplex, Ethernet activity, data port activity, and microcontroller error conditions.

The housing 80 includes a segregated interior chamber 92. The interior chamber 92 is isolated from cavities 81 and 83 to protect the internal electrical components from exposure to exterior elements. A first PCB 110 is disposed within the interior chamber 92 generally horizontal and parallel relative to the bottom wall 104. The first PCB 52 is soldered or otherwise electrically connected to the contact interface 112 and 114 which are electrical extensions of the contacts 98 and 100. Thus, the first PCB 110 is electrically interconnected to the contacts 98 and 100 of the ports 82 and 84. The contact interfaces 112 and 114 additionally provide structural support for the first PCB 110.

Insert assemblies 116 and 118 provide segregation between the open cavities 81 and 83 and the interior chamber 92. The contacts 98 and 100 are embedded within the assemblies 116 and 118 respectively and extend through such assemblies 116 and 118 and are exposed within the interior chamber 92 as contact interfaces 112 and 114.

A second PCB 120 is also placed within the interior chamber 92, positioned generally horizontal and in general parallel relation to the bottom wall 104. The second PCB 120 is soldered or otherwise electrically connected at both ends to a base insert 122. The base insert 122 supports both ends of the PCB 120. A connector lead 124 interconnects the first PCB 110 and the second PCB 120 to provide electrical communication between the PCBs.

The first PCB 110 and the second PCB 120 collectively incorporate the electronic circuitry components necessary to complete communication protocol conversion. Typically, PCB 110 would include the magnetic portions of the circuitry which include, but are not limited to, isolation transformers, common mode chokes, termination resistors, and high voltage discharge capacitors (for ESD and voltage surges). PCB 120 incorporates all of the electronic circuitry components necessary for the control functions of the conversion such as the microprocessor and memory devices. The electronic components onboard PCB 120 include, but are not limited to, a microprocessor and an Ethernet controller (combined in an ASIC for the present invention), non-volatile memory (flash memory in the present invention), voltage regulator, voltage supervisory circuit, crystals, resistors, capacitors, and ferrite beads (surface mount beads in the present invention).

In operation, the connector 91 is mounted on a PCB that is part of a host device or equipment. The PCB 110 is interconnected to the contacts 98 and 100 which mate with corresponding RJ-45 plugs (not shown) to effectively transmit data thereto. In IPv4 to IPv6 conversion, Ethernet data flows from the Ethernet port 82 through wiper contacts 98 interconnected to PCB 110. The data is processed by the circuitry collectively incorporated onto PCBs 110 and 120, and flow out as IPv6 converted data through wiper contact 100. IPv6 to IPv4 conversion flows in the reverse direction, namely, Ethernet data flows into RJ-45 jack 84 through the wiper contacts 100 to the PCB board 110. The electronic circuitry collectively incorporated onto PCBs 110 and 120 which thereafter transmits converted IPV-4 data to the RJ-45 jack 82 through wiper contact 98. It is additionally contemplated by the present invention and that the control circuitry, magnetic circuitry and LED circuitry may be interchanged among PCBs 110 and 120 and that electronic components may be positioned on one or both sides of each of the PCBs 110 and 120.

Figure 6:
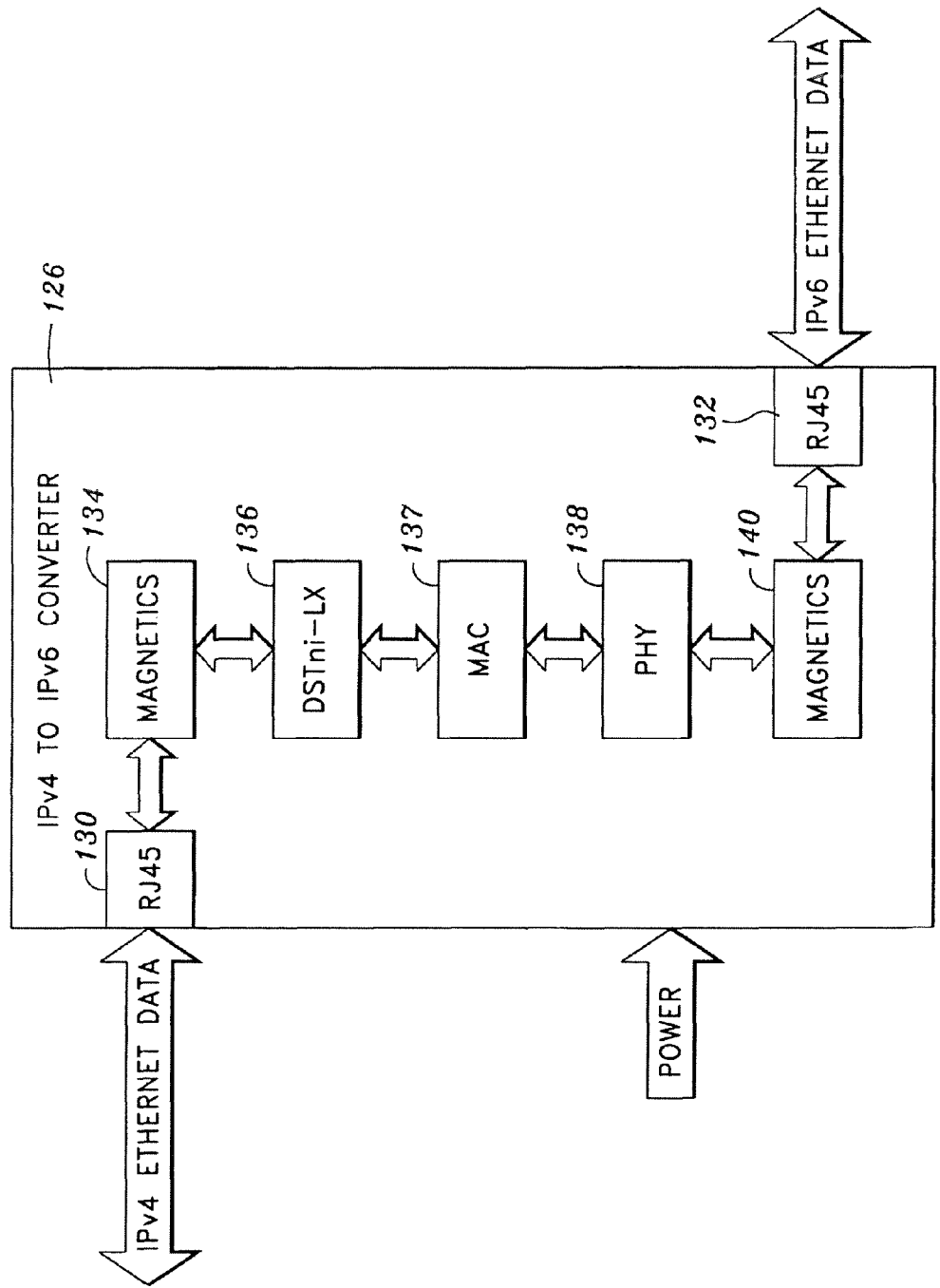
FIG. 6 is a block diagram of the components of a second alternative embodiment of the present invention.

Referring particularly to FIG. 6, there is shown a further alternate embodiment, of the present invention showing a protocol converter 126. The converter 126 is incorporated within a housing 128. An RJ-45 jack 130 is adapted to receive IPv4 Ethernet data. An RJ-45 jack 132 is provided for receiving IPv6 Ethernet data. In operation, IPv4 Ethernet data is filtered through the magnetics 132 to be accessible by a microprocessor 136. A DSTni-Lx™ (LX) chip commercially available from Lantronix, Inc. of Irvine, Calif. is used as the microprocessor 136, although any microprocessor of similar design may be used, A physical interface (PHY) 138 is additionally provided to enable the microprocessor 136 capable of receiving and outputting signals, The (PHY) 138 is electrically connected to the magnetics 140 which is in electrical connection with the RJ-45 jack 98. In this regard, the signal is manipulated and converted by the microprocessor 136 and is provided to the magnetics 140 to the (PHY) 138 and IPv6 Ethernet data as provided at RJ-45 jack 132. The system is bidirectional, and the IPv6 Ethernet data may be converted to IPv4 Ethernet data. In this embodiment using the LX processor, an additional Ethernet controller is required. The LX processor 136 has internal support for a single Ethernet interface. In order to provide for a second Ethernet interface, additional circuitry must be provided. The additional circuitry would include an interface from the LX processors programmable I/O pins and/or the dual port memory, or other interface, to a new MAC 137. Additionally, the MAC 137 would interface to a PHY 138 which would then interface to the magnetics. When connected to the legacy host, the device 126 appears transparent to the host. From the opposite side, the device 126 should appear as the host.

Figure 7:
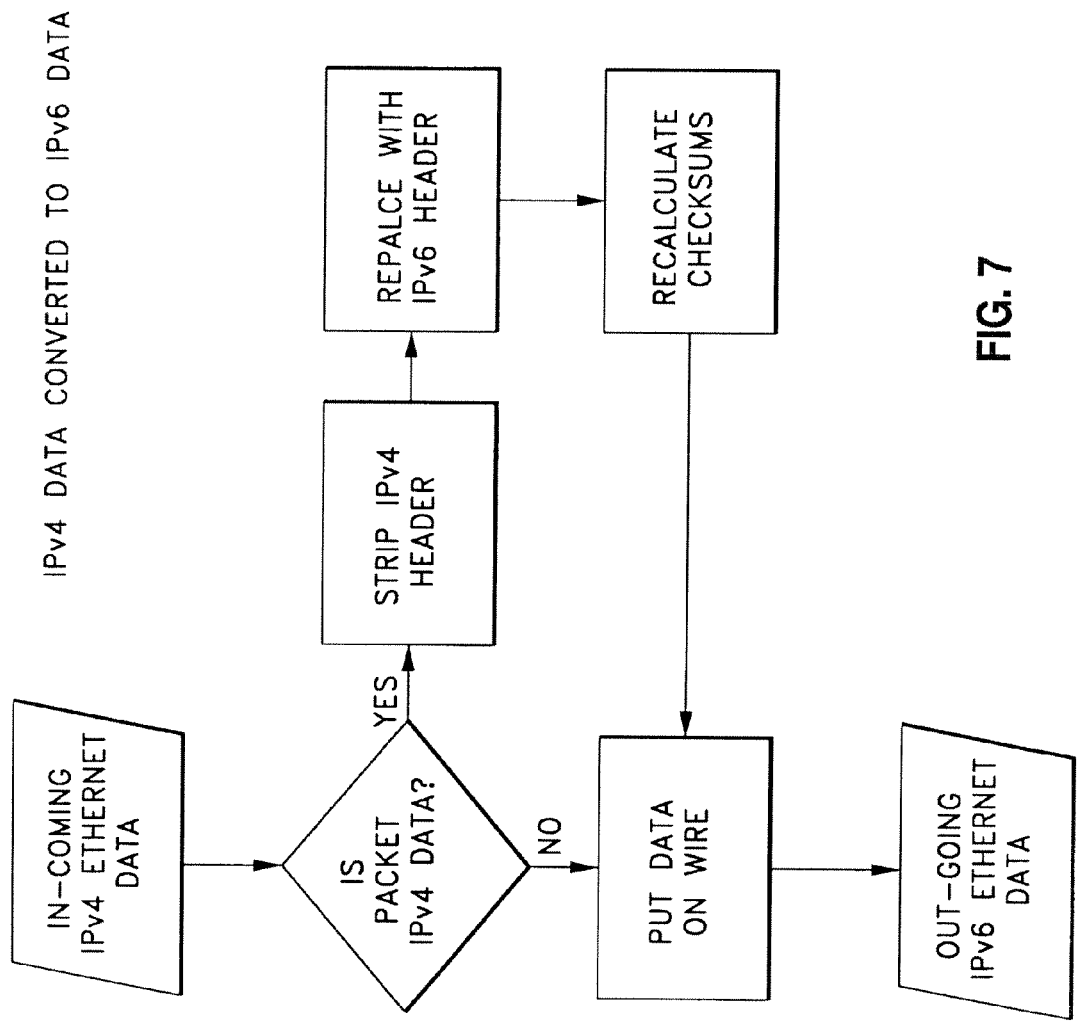
FIG. 7 is a flow chart showing a first method of the present invention.

Referring particularly to FIG. 7, there is shown the flow chart of software utilizing and completing the conversion from IPv4 to IPv6 used in each of the embodiments herein. In operation, incoming IPv4 Ethernet data is assessed to determine whether it is IPv4 data or IPv6 data. If it is IPv6 data, it is allowed to pass on to the output. If it is IPv4 data, the software strips the IPv4 header and replaces with an IPv6 header. The software thereafter does the necessary recalculation of the IP header fields, and is thereafter passed on to the output.

Figure 8:
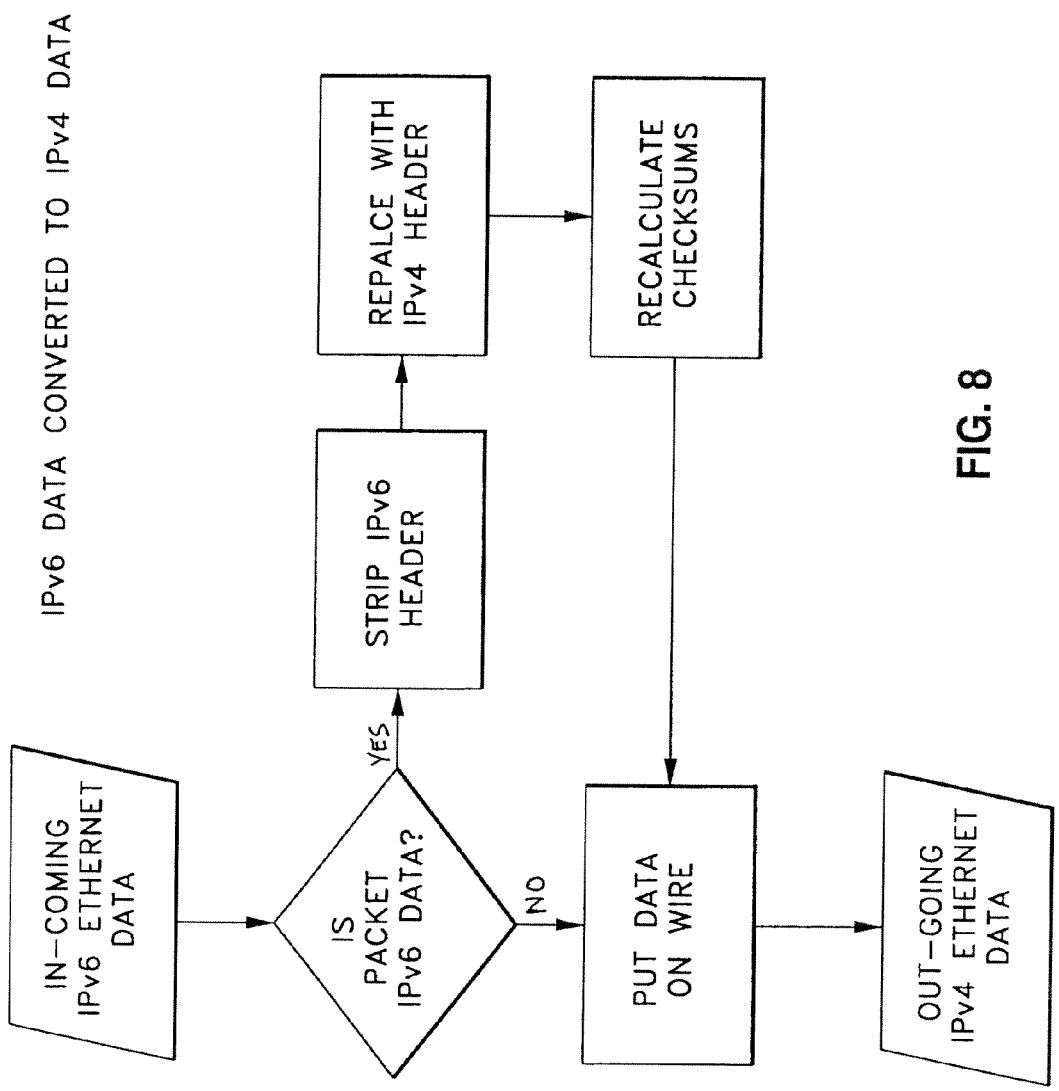
FIG. 8 is a flow chart shown a second method of the present invention.

The method as described in FIG. 7 is shown in reverse in FIG. 8. Particularly, in FIG. 8 incoming IPv6 data is assessed to determine whether its IPv6 data or IPv4 data. If it is IPv4 data, it is allowed to pass on to the output. If it is IPv6 data, the software strips the IPv6 header and replaces it with an IPv4 header. The software thereafter recalculates checksums and updates the IPv6 header fields, and the packet is thereafter passed on to the output.

It is understood with respect to each of the embodiments herein that in addition to the described methods of protocol conversion, any know methods of conversion may be employed, including but not limited to, IPv4/IPv6 stacks, tunneling IPv6 over IPv4, Network Address Translation-Protocol Translation (NAT-PT) and Stateless IP/ICMP Translation. NAT-PT encompasses Application Layer Gateways (ALGs) translating IPv4 to IPv6 for applications that have embedded IPv4 specific information in the data stream, such as FTP and DNS embedded in the host IP address in the data.

Additional modifications to the method of the present invention and the devices used in accordance with the method will be apparent to those skilled in the art. It is understood that such additional modifications are within the scope and spirit of the present invention.

What is claimed is:

1. A method of converting Ethernet data from an Internet protocol version 4 format to an Internet protocol version 6 format, comprising:
   providing an Internet protocol conversion circuitry disposable within a first and a second Ethernet connector, and the Internet protocol conversion circuitry comprising a magnetic circuitry and a controller circuitry,
   the magnetic circuitry comprising at least one of an isolation transformer, a common mode choke, a termination resistor, a high voltage discharge capacitor, and a filter, and
   the controller circuitry comprising at least one of a microprocessor, an Ethernet controller, Ethernet controller with an ASIC, a memory, a nonvolatile memory, a flash memory, a voltage regulator, a voltage supervisory circuit, a crystal, a resistor, a termination resistor, a capacitor, and a ferrite bead;
   receiving Ethernet data, comprising at least one Internet protocol version 4 data packet, by the first Ethernet connector and storing the at least one Internet protocol version 4 format data packet in the memory;
   removing at least one Internet protocol version 4 header from the at least one Internet protocol version 4 data packet in the memory by way of the Internet protocol conversion circuitry, thereby providing at least one unheadered data packet;
   inserting at least one Internet protocol version 6 header in relation to the at least one unheadered data packet in the memory by way of the Internet protocol conversion circuitry, thereby providing at least one reheadered data packet;
   recalculating at least one necessary Internet protocol header field of the at least one reheadered data packet in the memory by way of the Internet protocol conversion circuitry, the at least one necessary Internet protocol header field comprising at least one of a traffic class and a flow label;
   configuring the first and second Ethernet connectors by way of the Internet protocol conversion circuitry operating via a set of instructions; and
   transmitting the at least one reheadered data packet as Ethernet data, comprising at least one Internet protocol version 6 data packet, by the second Ethernet connector, thereby providing at least one converted data packet.

2. A method of converting Ethernet data from an Internet protocol version 6 format to an Internet protocol version 4 format, comprising:
   providing an Internet protocol conversion circuitry disposable within a first and a second Ethernet connector, wherein the Internet protocol conversion circuitry comprises at least a first and second Ethernet connector having a magnetic circuitry and a controller circuitry,
   the magnetic circuitry comprising at least one of an isolation transformer, a common mode choke, a termination resistor, a high voltage discharge capacitor, and a filter, and
   the controller circuitry comprising at least one of a microprocessor, an Ethernet controller, Ethernet controller with an ASIC, a memory, a nonvolatile memory, a flash memory, a voltage regulator, a voltage supervisory circuit, a crystal, a resistor, a termination resistor, a capacitor, and a ferrite bead;
   receiving Ethernet data, comprising at least one Internet protocol version 6 data packet, and storing the at least one Internet protocol version 6 format data packet in the memory;
   removing at least one Internet protocol 6 header from the at least one Internet protocol 6 data packet in the memory, by way of the Internet protocol conversion circuitry, thereby providing at least one unheadered data packet;
   inserting at least one Internet protocol 4 header in relation to the at least one unheadered data packet in the memory by way of the Internet protocol conversion circuitry, thereby providing at least one reheadered data packet;
   recalculating at least one necessary Internet Protocol header field, the at least one necessary Internet Protocol header field comprising an IPv4 checksum, of the at least one reheadered data packet in the memory;
   configuring the first and second Ethernet connectors by way of the Internet protocol conversion circuitry operating via a set of instructions; and
   transmitting the at least one reheadered data packet as Ethernet data, comprising at least one Internet protocol version 4 data packet, by the second Ethernet connector, thereby providing at least one converted data packet.

* * * * *